(12) United States Patent
Sumida et al.

(10) Patent No.: US 9,631,259 B2
(45) Date of Patent: Apr. 25, 2017

(54) METHOD FOR PRODUCING AQUEOUS SOLUTION OF PERRHENIC ACID FROM RHENIUM SULFIDE

(71) Applicant: PAN PACIFIC COPPER CO., LTD., Tokyo (JP)

(72) Inventors: Ikunobu Sumida, Oita (JP); Yuji Kawano, Oita (JP); Makoto Hamamoto, Oita (JP)

(73) Assignee: PAN PACIFIC COPPER CO., LTD., Tokyo (JP)

( * ) Notice: Subject to any disclaimer, the term of this patent is extended or adjusted under 35 U.S.C. 154(b) by 0 days.

(21) Appl. No.: 14/400,122

(22) PCT Filed: May 24, 2013

(86) PCT No.: PCT/JP2013/064517
§ 371 (c)(1),
(2) Date: Nov. 10, 2014

(87) PCT Pub. No.: WO2014/103398
PCT Pub. Date: Jul. 3, 2014

(65) Prior Publication Data
US 2015/0107414 A1  Apr. 23, 2015

(30) Foreign Application Priority Data
Dec. 28, 2012 (JP) ................................. 2012-288828

(51) Int. Cl.
*C01G 47/00* (2006.01)
*C22B 61/00* (2006.01)
*C22B 1/02* (2006.01)

(52) U.S. Cl.
CPC .............. *C22B 61/00* (2013.01); *C01G 47/00* (2013.01); *C22B 1/02* (2013.01); *C01P 2006/80* (2013.01); *Y02P 10/214* (2015.11); *Y02P 10/234* (2015.11)

(58) Field of Classification Search
None
See application file for complete search history.

(56) References Cited

U.S. PATENT DOCUMENTS

| | | | |
|---|---|---|---|
| 2,876,065 | A | 3/1959 | Zimmerley et al. |
| 2,967,757 | A | 1/1961 | Zimmerley et al. |
| 2,972,531 | A | 2/1961 | Zimmerley et al. |
| 3,770,414 | A | 11/1973 | Lake et al. |
| 4,321,089 | A | 3/1982 | Kruesi et al. |
| 2011/0126673 | A1 | 6/2011 | Dasan et al. |
| 2011/0229366 | A1 | 9/2011 | Luederitz et al. |

FOREIGN PATENT DOCUMENTS

| | | | |
|---|---|---|---|
| GB | 1 282 116 | A | 7/1972 |
| JP | 47-21323 | | 10/1972 |
| JP | 50-21998 | B1 | 7/1975 |
| JP | 62-124240 | * | 6/1987 |
| JP | 62-148327 | A | 7/1987 |
| JP | 2-20575 | B2 | 5/1990 |
| JP | 2011-117080 | A | 6/2011 |
| JP | 2011-178573 | A | 9/2011 |
| JP | 2012-149285 | A | 8/2012 |
| WO | WO 2011/115660 | A2 | 9/2011 |

OTHER PUBLICATIONS

Peimin et al., "Highly effective use of metallurgical material" Metallurgical Industry Press, Sep. 30, 2012, p. 144.*
Translatioin of Guo, "Efficient Use of Resources by Metallurgy" Metallurgical Industry Publisher, vol. 2, Section 5.6.3, Sep. 2012, p. 145.*
Translation of Zhang, "Tungsten-Molybdenum Metallurgy" Metallurgical Industry Publisher, Sep. 2005, pp. 210-216.*
International Preliminary Report on Patentability and English translation of the Written Opinion of the International Searching Authority (forms PCT/IB/373, PCT/ISA/237 and PCT/IB/338), issued Jul. 9, 2015, for International Application No. PCT/JP2013/064517.
Chinese Office Action and Search Report, dated Nov. 11, 2015, for Chinese Application No. 201380023732.6, with a partial English translation.
Guo, "Efficient Use of Resources by Metallurgy," Metallurgical Industry Publisher, vol. 2, Section 5.6.3, Sep. 2012, p. 145 (pp. 142-145 provided).
Zhang, "Tungsten-Molybdenum Metallurgy," Metallurgical Industry Publisher, Sep. 2005, pp. 210-216.
U.S. Appl. No. 14/400,028, filed Nov. 10, 2014.
Chinese Office Action and Search Report, dated Dec. 11, 2015, for Chinese Application No. 201380023747.2, with a partial English translation.

(Continued)

*Primary Examiner* — Steven Bos
(74) *Attorney, Agent, or Firm* — Birch, Stewart, Kolasch & Birch, LLP (57) ABSTRACT

A method allowing production of high-purity perrhenic acid from rhenium sulfide by applying pyrometallurgical process is provided. A method for producing an aqueous solution of perrhenic acid, comprising: 1) a step for performing a first roasting process of rhenium sulfide under an oxygen-containing gas to generate rhenium oxide and sulfur oxide, the sulfur oxide being gasified for discharge and the rhenium oxide being obtained as a roasted residue; 2) a step for performing a second roasting process of the roasted residue under an oxygen-containing gas to collect gasified rhenium oxide; 3) a step for cooling and solidifying the gasified rhenium oxide, or a step for dissolving the gasified rhenium oxide into water while water-cooling to obtain the aqueous solution of perrhenic acid; and 4) in case where the rhenium oxide is solidified, a step for dissolving the solidified rhenium oxide into water, or heating and gasifying the solidified rhenium oxide and then dissolving the gasified rhenium oxide into water, to obtain the aqueous solution of perrhenic acid.

20 Claims, 1 Drawing Sheet

(56) References Cited

OTHER PUBLICATIONS

Chinese Office Action with a partial English translation, dated Jun. 1, 2015, for Chinese Application No. 201380023747.2.
International Preliminary Report on Patentability and English translation of the Written Opinion of the International Searching Authority (Forms PCT/IB/338, PCT/IB/373, PCT/ISA/237), dated Jul. 9, 2015, for International Application No. PCT/JP2013/064516.
International Search Report, issued in PCT/JP2013/064517, dated Aug. 13, 2013.
Japanese Office Action, dated Aug. 25, 2015, for Japanese Application No. 2012-288826, with an English translation.
Metallurgy and Metal Material <Chemical Engineering Encyclopedia> Special Volume, Chemical Industry Publishing House, Jan. 31, 2001, p. 360, with a partial English translation.
En, "Catalyst Reform Process and Step," China Petrochemical Press Co., Ltd., First Edition, Nov. 30, 2006, p. 628 (4 pages provided).
English translation of paragraph 3 on p. 360 of "Metallurgy and Metal Material <Chemical Engineering Encyclopedia> Special Volume," Chemical Industry Publishing House, Jan. 31, 2001, 1 page.
Heshmatpour et al., "Recovery and Refining of Rhenium, Tungsten and Molybdenum From W—Re, Mo—Re and Other Alloy Scraps", Journal of Less-Common Metals, vol. 86, Jul. 1982, pp. 121-128.
Machine translation of Japanese Office Action dated Oct. 27, 2015 for Application No. 2012-288826.
US Non-Final Office Action dated Mar. 1, 2016, issued in U.S. Appl. No. 14/400,028.
Zhu et al., "Preparation of high-purity potassium perrhenate", Chemistry World, 12th edition, Dec. 31, 1988, p. 534 (3 pages provided).
US Final Office Action dated Aug. 18, 2016, issued in U.S. Appl. No. 14/400,028.

\* cited by examiner

METHOD FOR PRODUCING AQUEOUS SOLUTION OF PERRHENIC ACID FROM RHENIUM SULFIDE

TECHNICAL FIELD

The present invention relates to a method for producing an aqueous solution of perrhenic acid from rhenium sulfide. In particular, the present invention relates to a method for producing ammonium perrhenate from rhenium sulfide through perrhenic acid.

BACKGROUND ART

Rhenium is rare metal slightly entrained in molybdenite, which is molybdenum raw ore, or copper ore. It is important metal used as an element to be added to a catalyst, an element to be added to a thermocouple or a super heat resisting alloy, a high-vacuum electron tube material or the like.

As one of promising raw materials for industrially collecting rhenium, crude rhenium sulfide is exemplified. Zinc, bismuth or the like are typical impurities in the crude rhenium sulfide.

Hitherto, as described in JP-A-S62-148327 (Patent Literature 1), a method for producing potassium perrhenate from crude rhenium sulfide has been known. In the Literature, the crude rhenium sulfide is oxidized and leached using an oxidizing agent such as hydrogen peroxide, and hydrogen sulfide is added to post-leaching solution, thereby obtaining perrhenic acid with high purity in the solution. Then, the potassium perrhenate is produced by adding potassium hydroxide thereto. As described in JP-A-H2-20575 (Patent Literature 2), ammonium perrhenate can be produced from potassium perrhenate by a method of bringing the potassium perrhenate into contact with a cation exchange resin and then neutralizing the resultant material with aqueous ammonia and performing filtration, or the like. The ammonium perrhenate is marketable as a valuable material, and in a high value-added form.

Also, JP-A-S47-21323 (Patent Literature 3) describes a method for producing rhenium, characterized by roasting rhenium-containing molybdenum raw ore, extracting the resulting material with water, adding potassium chloride to this extract, dissolving a thus obtained precipitate into concentrated sulfuric acid, adjusting sulfuric acid concentration to 1 to 3 mol/l and then conducting extraction using an organic solvent containing a high-molecular-weight organic tertiary amine in a concentration of 0.02 mol/l or more, subsequently applying back extraction to this extract with an aqueous solution of caustic potash, and applying concentrated reduction treatment to this extract.

Further, Patent Literature 3 discloses that rhenium is contained in a form of rhenium sulfide, the rhenium sulfide is oxidized by roasting, and converted into rhenium oxide ($Re_2O_7$), the rhenium oxide is vaporized at a temperature of 150° C. or higher, and accumulated in flue dust. The Literature also discloses that, if the flue dust is subjected to extraction with water, the rhenium oxide ($Re_2O_7$) is absorbed into an aqueous solution, and that the aqueous solution contains a large amount of sulfur dioxide or sulfur trioxide, and therefore shows strong acidity.

CITATION LIST

Patent Literature

Patent Literature 1: JP-A-S62-148327
Patent Literature 2: JP-A-H2-20575
Patent Literature 3: JP-A-S47-21323

SUMMARY OF INVENTION

Technical Problem

As described in Patent Literature 1, a method for producing perrhenic acid from crude rhenium sulfide by hydrometallurgical process is known, but provision of a method for producing the perrhenic acid from the crude rhenium sulfide by pyrometallurgical process is also desired. In this regard, while Patent Literature 3 discloses that rhenium sulfide is oxidized and converted into rhenium oxide by roasting, and that the rhenium oxide is vaporized at a temperature of 150° C. or higher, and accumulated in flue dust, room for improvement has been left for removal of an impurity.

Therefore, an object of the present invention is to provide a method allowing production of high-purity perrhenic acid from rhenium sulfide by applying pyrometallurgical process.

Solution to Problem

The present inventors have diligently continued study in order to attain the object described above, and as a result, have found that a method for performing a two-step roasting process of rhenium sulfide is effective. More specifically, in a first-step roasting process, impurities such as sulfur is gasified and discharged, and rhenium, zinc, bismuth and so forth are remained on a residue side as a non-volatile component. In a second-step roasting process, while the non-volatile components such as zinc and bismuth are separated as a residue, rhenium is extracted as gasified rhenium oxide. Thus, purity of the rhenium oxide to be collected rises. When the rhenium oxide obtained is dissolved into water, an aqueous solution of high-purity perrhenic acid is obtained.

It can be understood that the present invention can target rhenium sulfide containing impurities, and also high-purity rhenium sulfide substantially containing no impurity. More specifically, in the first-step roasting process, sulfur oxide is generated from the rhenium sulfide, but in case where a roasting process is performed only in one step, the sulfur oxide becomes the impurity and is mixed into the rhenium oxide. However, the second-step roasting process is performed to allow further removal of the impurity, and therefore high-purity rhenium oxide having only a smaller amount of sulfur is obtained in comparison with a case where the roasting process is performed only in one step.

Accordingly, in one aspect, the present invention includes:
a method for producing an aqueous solution of perrhenic acid, comprising:
1) a step for performing a first roasting process of rhenium sulfide under an oxygen-containing gas to generate rhenium oxide and sulfur oxide, the sulfur oxide being gasified for discharge and the rhenium oxide being obtained as a roasted residue;
2) a step for performing a second roasting process of the roasted residue under an oxygen-containing gas to collect gasified rhenium oxide;

3) a step for cooling and solidifying the gasified rhenium oxide, or a step for dissolving the gasified rhenium oxide into water while water-cooling to obtain the aqueous solution of perrhenic acid; and 4) in case where the rhenium oxide is solidified, a step for dissolving the solidified rhenium oxide into water, or heating and gasifying the solidified rhenium oxide and then dissolving the gasified rhenium oxide into water, to obtain the aqueous solution of perrhenic acid.

In another aspect, the present invention includes:
a method for producing an aqueous solution of perrhenic acid, comprising:

1) a step for performing a first roasting process of rhenium sulfide containing at least one of zinc and bismuth under an oxygen-containing gas to generate rhenium oxide and sulfur oxide, the sulfur oxide being gasified for discharge and the rhenium oxide being obtained as a roasted residue along with the at least one of zinc and bismuth;

2) a step for performing a second roasting process of the roasted residue under an oxygen-containing gas to separate the at least one of zinc and bismuth as a roasted residue and to collect gasified rhenium oxide;

3) a step for cooling and solidifying the gasified rhenium oxide, or a step for dissolving the gasified rhenium oxide into water while water-cooling to obtain the aqueous solution of perrhenic acid; and 4) in case where the rhenium oxide is solidified, a step for dissolving the solidified rhenium oxide into water, or heating and gasifying the solidified rhenium oxide and then dissolving the gasified rhenium oxide into water, to obtain the aqueous solution of perrhenic acid.

In one embodiment of the method for producing the aqueous solution of perrhenic acid as related to the present invention, the first roasting process is finished when a content of S in the roasted residue is within a range of 0.5 to 20 mass %.

In another embodiment of the method for producing the aqueous solution of perrhenic acid as related to the present invention, the first roasting process is performed at an in-furnace temperature of 100 to 350° C.

In still another embodiment of the method for producing the aqueous solution of perrhenic acid as related to the present invention, the second roasting process is performed at an in-furnace temperature of 200 to 600° C.

In still another embodiment of the method for producing the aqueous solution of perrhenic acid as related to the present invention, the oxygen-containing gas is preheated at 100° C. or higher in the first roasting process and the second roasting process.

In still another embodiment of the method for producing the aqueous solution of perrhenic acid as related to the present invention, the step for cooling and solidifying the gasified rhenium oxide is performed while keeping entrained sulfur oxide in a gaseous state for solid-gas separation of the sulfur oxide.

In still another embodiment of the method for producing the aqueous solution of perrhenic acid as related to the present invention, the solidified rhenium oxide is collected on a material insoluble in rhenic acid in the step for cooling and solidifying the gasified rhenium oxide.

In still another aspect, the present invention includes a method for producing potassium perrhenate, comprising using as a raw material the aqueous solution of perrhenic acid obtained by the method for producing the aqueous solution of perrhenic acid as related to the present invention.

In still another aspect, the present invention includes a method for producing ammonium perrhenate, comprising using as a raw material the aqueous solution of perrhenic acid obtained by the method for producing the aqueous solution of perrhenic acid as related to the present invention.

In still another aspect, the present invention includes a method for producing rhenium metal, comprising using as a raw material the aqueous solution of perrhenic acid as obtained by the method for producing the aqueous solution of perrhenic acid as related to the present invention.

Advantageous Effects of Invention

The present invention provides a pyrometallurgical process according to which high-purity perrhenic acid can be produced from rhenium sulfide. The present invention can be incorporated into a method for producing ammonium perrhenate from rhenium sulfide.

DESCRIPTION OF EMBODIMENTS

In one embodiment of a method for producing an aqueous solution of perrhenic acid as related to the present invention, the method comprises:

1) a step for performing a first roasting process of rhenium sulfide under an oxygen-containing gas to generate rhenium oxide and sulfur oxide, the sulfur oxide being gasified for discharge and the rhenium oxide being obtained as a roasted residue;

2) a step for performing a second roasting process of the roasted residue under an oxygen-containing gas to collect gasified rhenium oxide;

3) a step for cooling and solidifying the gasified rhenium oxide, or a step for dissolving the gasified rhenium oxide into water while water-cooling to obtain the aqueous solution of perrhenic acid; and 4) in case where the rhenium oxide is solidified, a step for dissolving the solidified rhenium oxide into water, or heating and gasifying the solidified rhenium oxide and then dissolving the gasified rhenium oxide into water, to obtain the aqueous solution of perrhenic acid.

In another embodiment of a method for producing an aqueous solution of perrhenic acid as related to the present invention, the method comprises:

1) a step for performing a first roasting process of rhenium sulfide containing at least one of zinc and bismuth under an oxygen-containing gas to generate rhenium oxide and sulfur oxide, the sulfur oxide being gasified for discharge and the rhenium oxide being obtained as a roasted residue along with the at least one of zinc and bismuth;

2) a step for performing a second roasting process of the roasted residue under an oxygen-containing gas to separate the at least one of zinc and bismuth as a roasted residue and to collect gasified rhenium oxide;

3) a step for cooling and solidifying the gasified rhenium oxide, or a step for dissolving the gasified rhenium oxide into water while water-cooling to obtain the aqueous solution of perrhenic acid; and 4) in case where the rhenium oxide is solidified, a step for dissolving the solidified rhenium oxide into water, or heating and gasifying the solidified rhenium oxide and then dissolving the gasified rhenium oxide into water, to obtain the aqueous solution of perrhenic acid.

(Rhenium Sulfide)

Rhenium sulfide to be treated in the present invention may be rhenium sulfide containing no impurity or crude rhenium sulfide containing impurities. It is typically crude rhenium sulfide containing at least one of zinc and bismuth, and more typically, crude rhenium sulfide containing both. In the present invention, "rhenium sulfide" means both the crude rhenium sulfide containing impurities and the rhenium sulfide containing substantially no impurity. An origin of the crude rhenium sulfide is not restricted, but typical examples include crude rhenium sulfide originating from the following.

In waste acid obtained by performing water-wash of a sulfurous acid gas generated from a step for smelting non-ferrous metal such as copper, rhenium which was contained in raw ore is mixed with impurities. Rhenium, bismuth, zinc, mercury, arsenic, iron, copper and so forth are generally contained in such waste acid. The rhenium in the waste acid exists in a form of rhenic acid ($HReO_4$). When the rhenium in the waste acid is allowed to react with hydrogen sulfide, rhenium sulfide is formed and can be collected in a form of powder by solid-liquid separation. At this time, zinc and bismuth do not react with the hydrogen sulfide, and therefore can be separated on a liquid phase.

In order to provide rhenium sulfide containing only a small amount of impurities, the impurities can also be removed by the following methods. For example, the waste acid is passed through a resin having strong adsorbability to mercury, such as a chelate resin and a strongly basic anion exchange resin, thereby allowing removal of mercury. Moreover, the waste acid after removal of mercury is passed through an anion exchange resin to selectively adsorb included rhenium and bismuth onto the resin, thereby allowing removal of arsenic, iron and copper that do not adsorb on the resin. An eluent such as hydrochloric acid is passed through the anion exchange resin on which rhenium and bismuth are adsorbed, thereby stripping of rhenium and bismuth from the anion exchange resin is achieved. Bismuth can be separated from rhenium by chromatography.

In a typical embodiment, according to a chemical analysis (elements other than mercury are determined by ICP-OES and mercury is determined by reducing vaporization absorptiometry), the crude rhenium sulfide contains rhenium: 30 to 62 mass %, sulfur: 20 to 38 mass %, zinc: 0.01 to 1.0 mass %, bismuth: 0.01 to 1.0 mass % and mercury: 0.01 to 1.0 mass %, and in a further typical embodiment, the crude rhenium sulfide contains rhenium: 35 to 50 mass %, sulfur: 25 to 32 mass %, zinc: 0.01 to 0.5 mass %, bismuth: 0.01 to 0.7 mass % and mercury: 0.01 to 0.7 mass %. Rhenium may partially exist in a form of rhenium oxide in several cases.

(Step 1)

In step 1, a first roasting process of rhenium sulfide is performed under an oxygen-containing gas to generate rhenium oxide and sulfur oxide, the sulfur oxide being gasified for discharge and the rhenium oxide being obtained as a roasted residue. In case where at least one of zinc and bismuth is contained in the rhenium sulfide, they are preferably collected in the roasted residue along with the rhenium oxide.

Types of furnaces for carrying out the first roasting process are not particularly restricted, and specific examples include a kiln furnace, a fluidized bed furnace and a tubular furnace, but the kiln furnace is further preferred due to presence of agitation action by rotation and high reaction efficiency with oxygen.

In the first roasting process, the rhenium sulfide is considered to be converted into the rhenium oxide according to the following reaction formulas.

(Formula 1)

In the first roasting process, generated sulfur oxide is intended to be gasified and separated from the rhenium oxide. Therefore, from viewpoints of efficiency of removal of the impurities and efficiency of collection of rhenium, the roasting process is preferably carried out under conditions of retaining the rhenium oxide in the furnace without gasification while the sulfur oxide is gasified and discharged outside the furnace through gas piping or the like. More specifically, if heating temperature becomes excessively high, a ratio of rhenium oxide lost by gasification increases, and on the other hand, if the heating temperature is excessively low, a ratio of removal of by-produced sulfur oxide decreases. Incidentally, in case where mercury or arsenic is contained as the impurity in the rhenium sulfide, removal treatment of the materials can also be made in the first roasting process in a similar manner.

Results of study by the present inventors show that the first roasting process is finished when the content of S in the roasted residue is preferably in a range of 0.5 to 20 mass %, more preferably, in a range of 0.5 to 10 mass %, and still more preferably, in a range of 0.5 to 5 mass %, thereby achieving a high rhenium recovery while the impurities are effectively removed.

In order to achieve S content in the roasted residue in the range described above, the first roasting process is performed by adjusting in-furnace temperature in a roasting furnace preferably to 100 to 350° C., and more preferably, to 200 to 350° C. Moreover, although roasting time depends on a scale or structure of the roasting furnace, if the time is too long, gasification of rhenium proceeds, and on the other hand, if the time is too short, an oxidation reaction does not sufficiently take place. Therefore, the time can be adjusted to 30 to 240 minutes, for example, and preferably, to 120 to 180 minutes.

In order to suppress the reaction in case where in-furnace temperature rapidly rises, provision for supplying an inert gas such as nitrogen and argon into the furnace is also desired.

Specific examples of the oxygen-containing gas include oxygen, air and a mixture of oxygen and inert gas, but use of air is preferred in view of avoiding an increase the cost. The oxygen-containing gas referred to herein includes an oxygen-containing gas existing in a form of gas from the beginning and also an oxygen-containing gas produced by using solid or liquid (for example, potassium chlorate, ammonium perchlorate) which generates oxygen by heating. The oxygen-containing gas, from a viewpoint of reaction efficiency, preferably supplies oxygen in an amount equal to or more than a theoretical equivalent to be required in the above (formula 1). For example, it can be adjusted to 1.2 times or more, and more preferably, 1.8 times or more as much as the theoretical equivalent.

The oxygen-containing gas is desirably preheated prior to supply to the roasting furnace. Preheating of the oxygen-containing gas allows setup of low inner wall temperature in the roasting furnace, and a decrease in a ratio of gasification of rhenium oxide. More specifically, in case where the oxygen-containing gas is not preheated, in terms of heat transfer, a high setup value of the inner wall temperature in the roasting furnace is required in order to reach temperature at which the oxidation reaction at an interface between the oxygen-containing gas and the rhenium sulfide sufficiently progresses. The above means that the inner wall temperature in the roasting furnace reaches or goes beyond the temperature essentially needed for the oxidation reaction, resulting in progress of gasification of the rhenium oxide near the inner wall. On the other hand, preheating of the oxygen-containing gas eliminates necessity of increasing the inner wall temperature in the roasting furnace beyond necessity, and therefore gasification of the rhenium oxide can be suppressed.

From the viewpoint described above, the oxygen-containing gas is preferably preheated to the temperature identical with in-furnace temperature. However, excessive preheating beyond necessity causes energy loss.

(Step 2)

In step 2, the second roasting process is performed to the roasted residue obtained in step 1 under the oxygen-containing gas to collect the gasified rhenium oxide. In case where at least one of zinc and bismuth is contained in the roasted residue, they are preferably separated from the rhenium oxide as the roasted residue.

Types of furnaces for carrying out the second roasting process are not particularly restricted as is the case with the first roasting process, and specific examples include a kiln furnace, a fluidized bed furnace and a tubular furnace, but the tubular furnace is preferred for the reason of reduction of contamination due to a scattered residue during collection, and cost.

The roasted residue can be once removed from the furnace used in the first roasting process and can be subjected to the second roasting process in another roasting furnace, or a roasting furnace identical with the furnace in the first roasting process can be used. Another roasting furnace is preferably used from a viewpoint of suppressing contamination. In case where the identical roasting furnace is used, it is desirable to prevent contamination for obtaining high-purity rhenium oxide by the following steps. A reaction vessel such as a reaction tube is introduced into the furnace. After the first roasting process, the residue was cooled to room temperature, taken out and transferred to another reaction vessel, and then the vessel is returned to the furnace to carry out the second roasting process.

The second roasting process has a purpose of positively gasifying the rhenium oxide, and therefore is ordinarily carried out by setting up the in-furnace temperature in the roasting furnace to a temperature higher than that in the first roasting process. However, if excessively high temperature is set up, zinc or bismuth might also be gasified, and therefore the second roasting process is carried out by adjusting the in-furnace temperature in the roasting furnace preferably to 200 to 600° C., more preferably, to 300 to 550° C., and still more preferably, to 350 to 500° C. Moreover, although roasting time depends on a scale or structure of the roasting furnace, if the time is too long, energy loss increases, and on the other hand, if the time is too short, volatilization does not sufficiently proceed, and therefore the time is adjusted preferably to 30 to 240 minutes, for example, and further preferably, to 120 to 180 minutes.

If the oxidation reaction of the rhenium sulfide and removal of the sulfur oxide are sufficiently completed in the first roasting process, an atmospheric gas required in the second roasting process only needs to play a role of a carrier gas for transporting the gasified rhenium oxide. However, the oxidation reaction of the rhenium sulfide and the removal of the sulfur oxide in the first roasting process may be imperfect, and therefore the oxygen-containing gas is to be used also in the second roasting process in the present invention.

Also in the second roasting process, the oxygen-containing gas is desirably preheated prior to supply to the roasting furnace. Preheating of the oxygen-containing gas gives an advantage of uniformization of an in-furnace reaction.

For transporting the gasified rhenium oxide, gas piping may be used. Moreover, in case where the identical roasting furnace is used, the gasified rhenium oxide is preferably collected using gas piping different from the gas piping used during the first roasting process from a viewpoint of preventing impurities from being mixed.

The gas piping is preferably heat-insulated to prevent the rhenium oxide from sticking onto a piping inner wall during transportation. If in-piping temperature during heat insulation is too low, the rhenium oxide might be solidified, and therefore the temperature is preferably adjusted to 300° C. or higher. And, from a viewpoint of energy consumption, an increase in temperature beyond necessity is unnecessary, and therefore the temperature is typically 500° C. or lower, and more typically, 400° C. or lower.

(Step 3)

Then, the gasified rhenium oxide can be cooled and solidified. On the occasion, the sulfur oxide is preferably subjected to solid-gas separation by cooling and solidifying the gasified rhenium oxide while keeping the sulfur oxide entrained in the gasified rhenium oxide a gaseous state for improving the purity of the rhenium oxide. The rhenium oxide is desirably cooled and solidified at a predetermined cooling part (may be inside the piping or in a container having an inlet and an outlet) in view of an improvement in working efficiency. At this time, the sulfur oxide entrained therein directly passes through the cooling part as gas due to a difference in boiling points, and therefore the purity of rhenium oxide is improved by the solid-gas separation. From a viewpoint of contamination prevention, the solidified rhenium oxide is preferably collected on a material insoluble in rhenic acid, for example, quartz or glass, and can be collected into the piping or container using these materials for an inner wall material. Upon the solid-gas separation, a filter may be installed in order to enhance the rhenium recovery. Specific examples of cooling include methods using spontaneous cooling and heat exchange, but for the reason of simplification of a device, the method using spontaneous cooling is preferably applied.

The rhenium oxide is cooled to 100° C. or lower, and preferably, 80° C. or lower, thereby allowing complete solidification. If temperature is lower than necessary, even the sulfur oxide flowing together with the rhenium oxide from the roasting furnace is liquefied or solidified and then co-collected. Therefore, the rhenium oxide is preferably cooled to a temperature of 50° C. or higher, which is a boiling point of $SO_3$ or higher, in order to completely exclude the sulfur oxide. However, generated sulfur oxide is ordinarily in a form of $SO_2$, and therefore the rhenium oxide may be cooled to room temperature (e.g.: 5 to 30° C.), which is a boiling point of $SO_2$ or higher.

Alternatively, dissolving the gasified rhenium oxide into water while water-cooling also allows direct obtaining of the aqueous solution of perrhenic acid. A reaction formula at this time is identical with the formula described in step 4. Specific examples of the methods for allowing dissolution into water while water-cooling include a method of collecting gasified rhenium oxide discharged from a roasting furnace using a wet scrubber, a wet filtration method or a wet electrostatic precipitator. When the wet scrubber is used, a pellet-shaped, cylinder-shaped or honeycomb-shaped packing material or the like is preferably charged thereinto in order to increase a gas-liquid contact area. The method does not pass through the step for solidifying the rhenium oxide, and therefore is highly simple. However, even the sulfur oxide dissolves into water together with the rhenium oxide, and therefore this method is inferior to the method of solidifying the rhenium oxide from a viewpoint of purity. To give an illustrative example, according to the method for dissolving the rhenium oxide into water, a content of S in the aqueous solution of perrhenic acid is increased by about 5 to 10 times in comparison with the method of solidifying the rhenium oxide.

(Step 4)

In step 4, in case where the rhenium oxide is solidified, the solidified rhenium oxide is dissolved into water, or heated and gasified and then dissolved into water to obtain the aqueous solution of perrhenic acid. The rhenium oxide is considered to be converted into the perrhenic acid according to the reaction formula described below.

$$Re_2O_7(s \text{ or } g) + H_2O(l) \rightarrow 2HReO_4(l) \quad \text{(Formula 2)}$$

The rhenium oxide is easily soluble in water, but if the concentration in the aqueous solution is too high, the reaction efficiency is considered to decrease. On the other hand, if the concentration is too low, an amount of use of water increases and handling properties during operation are deteriorated, and a concentration step is required thereafter. Therefore, an amount of charge of the rhenium oxide into water is preferably 50 to 500 g/L, and more preferably, 150 to 250 g/L.

A method of bringing the solidified rhenium oxide into solid-liquid contact to dissolve the rhenium oxide into water is simple, but it is also an applicable method that the solidified rhenium oxide is heated and gasified again, and then bringing the resulting gas into gas-liquid contact by a scrubber or the like to dissolve the rhenium oxide into water. However, the latter method causes loss due to uncollection, and therefore the former method is further preferred.

From the aqueous solution of perrhenic acid, potassium perrhenate and also ammonium perrhenate can be produced by any publicly known method. For example, potassium hydroxide is added to the aqueous solution of perrhenic acid to control pH to about 11 to 13, thereby allowing precipitation of the potassium perrhenate, which can be collected according to the solid-liquid separation. Moreover, the potassium perrhenate is heavy and easy to settle, and therefore is preferably subjected to the solid-liquid separation after a floatable impurity is separated. Moreover, the purity can also be improved by elutriation or the like. The potassium perrhenate is reduced with hydrogen or the like, thereby allowing production of rhenium metal (for example, see JP-A-S62-124240).

Moreover, controlling perrhenic acid solution pH to about 7 to 12 by adding aqueous ammonia, the ammonium perrhenate can be precipitated and be recovered by the solid-liquid separation Purification can be repeated for purity enhancement. Specific examples of the purification methods include a method of performing redissolution into pure water and crystallization. After neutralization, prior to performing the solid-liquid separation, the resultant mixture is preferably heated to 90 to 105° C., and concentrated. Rhenium metal can be produced by reducing the ammonium perrhenate with hydrogen or the like (for example, see JP-A-S62-146227).

EXAMPLES

Examples of the present invention will be described below, but the Examples are for illustrative purpose and the present invention is not intended to be limited thereby.

(Verification of Effect by a First Roasting Process)

Crude rhenium sulfide having analytical values described in Table 1 was prepared. A content of each component was determined by a chemical analysis (determined by ICP-OES).

TABLE 1

|  | Re | S | Bi | Zn |
|---|---|---|---|---|
| Content (mass %) | About 48% | About 28% | About 0.1 | About 0.5 |

Then, 500 g of the crude rhenium sulfide was subjected a first roasting process for 120 to 140 minutes under various in-furnace conditions of the kiln furnace, and then the resultant product was cooled to room temperature. As a roasting furnace, a kiln furnace was used, and as an oxygen-containing gas, air was used. In all examples, an oxygen equivalent was adjusted to the range of 1.9 to 2.2. Moreover, it was found that supply of air to the kiln furnace after preheating the air to predetermined temperature (140° C., herein) tended to stabilize in-furnace temperature, and a ratio of volatilization of sulfur rose. The weight of a residue after testing was measured and a chemical analysis of the residue was conducted. A content (g) of each element was determined from the weight of the residue and the results of elemental analysis of each element, and a ratio of gasification was determined from a difference in the content (g) before and after testing.

Roasting time means a period of time from time at which the in-furnace temperature in the kiln furnace reaches predetermined temperature to time at which cooling is started. The oxygen equivalent was calculated on the assumption that rhenium and sulfur contained in the crude rhenium sulfide exist in a form of $Re_2S_7$, or in the form other than oxide, and a theoretical oxygen equivalent in which all of rhenium reacts to $Re_2O_7$ and all of sulfur reacts to $SO_3$ is 1.

As a result, when the in-furnace temperature of the kiln furnace was 100° C. or higher and lower than 200° C., a ratio of gasification of Re was 10% or more and less than 20%, when the in-furnace temperature of the kiln furnace was 200° C. or higher, the ratio increased to 20% or more, and when the in-furnace temperature of the kiln furnace exceeded 350° C., the ratio exceeded 40%. A ratio of gasification of S was 10% or more at an in-furnace temperature of the kiln furnace of 100° C. or higher, and the ratio was 80% or more at an in-furnace temperature of the kiln furnace of 300° C. or higher. In addition, ratios of gasification of Zn and Bi were substantially 0% at an in-furnace temperature of the kiln furnace of lower than 600° C.

(Verification of Effect by a Two-Step Roasting Process: A Case of Solidifying Gasified Rhenium Oxide and then Producing an Aqueous Solution of Perrhenic Acid)

Crude rhenium sulfide having analytical values described in Table 3 was prepared. A content of each component was determined by a chemical analysis (determined by ICP-OES).

TABLE 2

|  | Re | S | Bi | Zn |
|---|---|---|---|---|
| Content (mass %) | 39.5 | 29.4 | 0.48 | 0.18 |

Then, 150 g of the crude rhenium sulfide was subjected to a first roasting process under conditions described in Table 3-1, and then cooled to room temperature. A tubular furnace was used as a roasting furnace and air was used as an oxygen-containing gas. In the same manners the example described above, a ratio of gasification of S, a content of S in a roasted residue, a ratio of gasification of Re, a ratio of gasification ratio of Zn and a ratio of gasification of Bi were determined. The results are shown in Table 3-2.

TABLE 3-1

| In-furnace temperature of tubular furnace | Roasting time | Preheating of air | Oxygen equivalent |
|---|---|---|---|
| 300° C. | 120 minutes | None | 1.5 to 2.0 |

TABLE 3-2

| Ratio of gasification of S | Ratio of gasification of Re | Ratio of gasification of Zn | Ratio of gasification of Bi |
|---|---|---|---|
| 80% or more | 30 to 40% | 0% | 0% |

Figure 1:
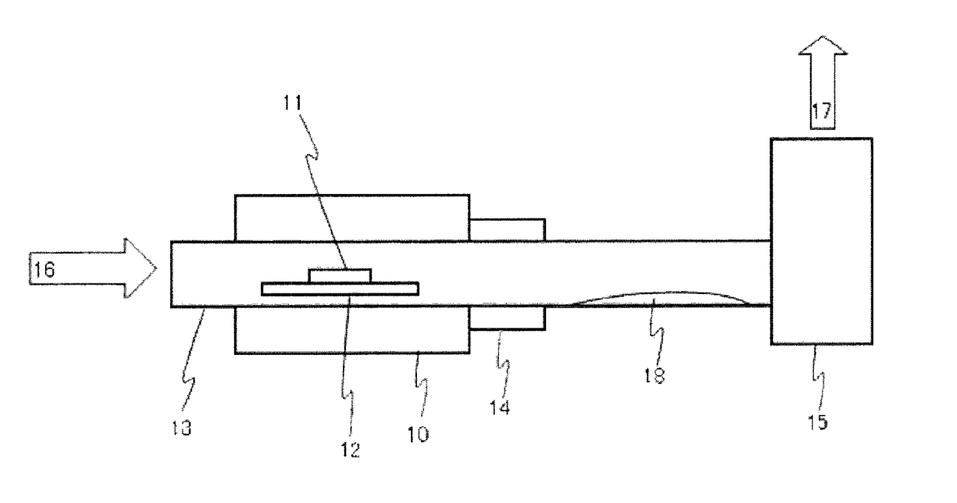
FIG. 1 is a schematic diagram of roasting equipment used for a second-step roasting process in Examples.

Next, 133 g of the residue obtained in the first roasting process was subjected to a second roasting process using roasting equipment described in FIG. 1 under conditions described in Table 4-1. As a roasting furnace, tubular furnace 10 different from the furnace in the first roasting process was used, and air 16 was supplied at a flow rate of 1.5 L/min. A component containing the gasified rhenium oxide was transported in a gasified state at a predetermined distance in tubular furnace external reaction tube insulation part 14 kept at 300° C., and then cooled in a non-heat-insulated part in reaction tube 13 having an inner wall made of quartz, and precipitated as solid-state rhenium oxide 18. Incidentally, gas temperature was in a state in which the gas was cooled to room temperature (about 30° C.) on the way from the insulation part to a scrubber. Sulfur oxide in the gas out of the reaction tube was absorbed in scrubber 15, and the gas was made harmless and discharged. Reaction tube 13 in which rhenium oxide 18 precipitated was removed, water at room temperature was passed into reaction tube 13 to dissolve the rhenium oxide and to obtain an aqueous solution of perrhenic acid. Each component concentration in the aqueous solution of perrhenic acid obtained was determined by a chemical analysis (determined by ICP-OES), and a ratio of collection of each component when the residue prior to the second roasting process was taken as a standard (100%) was determined. The results are shown in Table 4-2 and Table 4-3.

TABLE 4-1

| In-furnace temperature of tubular furnace | Roasting time | Preheating of air |
|---|---|---|
| 450 to 500° C. | 180 minutes | none |

TABLE 4-2

| Ratio of collection of S | Ratio of collection of Re | Ratio of collection of Zn | Ratio of collection of Bi |
|---|---|---|---|
| 1.6% | 80.4% | 0.3% | 0% |

TABLE 4-3

| | Analytical values | | |
|---|---|---|---|
| Unit | Re | S | Bi, Zn |
| Mass mg/L | 132,000 | 0.1% or less in concentration based on Re concentration | 0.005% or less in total concentration of both based on Re concentration |

Aqueous ammonium was added to the resulting aqueous solution of perrhenic acid until pH became 9 for neutralization, and then solid-liquid separation was performed to obtain powder of ammonium perrhenate (APR). The results of analysis of the ammonium perrhenate are shown in Table 5. The analysis was conducted by GDMS. High-purity ammonium perrhenate was found to be obtained.

TABLE 5

| | Analytical values | | |
|---|---|---|---|
| Unit | Re | S | Bi, Zn |
| Mass ppm | about 70 (mass %) | <10 | <1 in total concentration of both |

Comparative Example

Crude rhenium sulfide having analytical values described in Table 6 was prepared. A content of each component was determined by a chemical analysis (determined by ICP-OES).

TABLE 6

|  | Re | S | Bi | Zn |
|---|---|---|---|---|
| Content (mass %) | about 50 | about 20 | 0.01 | 0.01 |

Then, 531 g of the crude rhenium sulfide was subjected to a roasting process using roasting equipment described in FIG. 1 under conditions described in Table 7-1. Then, the resultant product was cooled to room temperature. As a roasting furnace, tubular furnace 10 was used, and as an oxygen-containing gas, air 16 was supplied at a flow rate of 1.5 L/min. In the same manner as the example described above, a ratio of gasification of S, a content of S in a roasted residue, a ratio of gasification of Re, a ratio of gasification of Zn and a ratio of gasification of Bi were determined. The results are shown in Table 7-2.

TABLE 7-1

| In-furnace temperature of tubular furnace | Roasting time | Preheating of air | Oxygen equivalent |
|---|---|---|---|
| 450 to 500° C. | 180 minutes | None | 1.5 to 2.0 |

TABLE 7-2

| Ratio of gasification of S | Ratio of gasification of Re | Ratio of gasification of Zn | Ratio of gasification of Bi |
|---|---|---|---|
| 80% or more | 90% or more | 0% | 0% |

Subsequently, a component containing the gasified rhenium oxide was transported in a gasified state at a predetermined distance in tubular furnace external reaction tube insulation part 14 kept at 300° C., and then cooled in a non-heat-insulated part of reaction tube 13 having an inner wall made of quartz, and precipitated as solid-state rhenium oxide 18. Incidentally, gas temperature was in a state in which the gas was cooled to room temperature (about 30° C.) on the way from the insulation part to a scrubber. Sulfur oxide in the gas out of the reaction tube was absorbed in scrubber 15, and the gas was made harmless and discharged. Reaction tube 13 in which rhenium oxide 18 precipitated was removed, water at room temperature was passed into reaction tube 13 to dissolve the rhenium oxide and to obtain an aqueous solution of perrhenic acid. Each component concentration in the aqueous solution of perrhenic acid obtained was determined by a chemical analysis (determined by ICP-OES), and the recovery of each component when concentration in the crude rhenium sulfide was taken as a standard (100%) was determined. The results are shown in Table 8-1 and Table 8-2.

TABLE 8-1

| Ratio of collection of S | Ratio of collection of Re |
|---|---|
| Less than 1% | 70% or more |

TABLE 8-2

| | Analytical values | | |
|---|---|---|---|
| Unit | Re | S | Bi, Zn |
| Mass mg/L | 170,000 | 0.2% in concentration of based on Re concentration | 0.005% or less in total concentration of both based on Re concentration |

Powder of ammonium perrhenate (APR) was obtained by adding aqueous ammonium to the resulting aqueous solution of perrhenic acid until pH became 9 for neutralization, and then performing solid-liquid separation. The results of analysis of the ammonium perrhenate are shown in Table 9. The analysis was conducted by GDMS.

TABLE 9

| | Analytical values | | |
|---|---|---|---|
| Unit | Re | S | Bi, Zn |
| Mass mg/L | About 70 (mass %) | About 100 | <1 in total concentration of both based on Re concentration |

REFERENCE SIGNS LIST

10 Tubular furnace
11 Sample
12 Sample place
13 Reaction tube
14 Reaction tube insulation part
15 Scrubber
16 Air
17 Exhaust
18 Rhenium oxide

What is claimed is:

1. A method for producing an aqueous solution of perrhenic acid, comprising:
   1) performing a first roasting of rhenium sulfide under an oxygen-containing gas to generate rhenium oxide and sulfur oxide, the sulfur oxide being gasified for discharge and the rhenium oxide being obtained as a roasted residue;
   2) performing a second roasting of the roasted residue under an oxygen-containing gas to collect gasified rhenium oxide;
   3) cooling and solidifying the gasified rhenium oxide; and
   4) dissolving the solidified rhenium oxide into water, or heating and gasifying the solidified rhenium oxide and then dissolving the gasified rhenium oxide into water, to obtain the aqueous solution of perrhenic acid.

2. The method for producing the aqueous solution of perrhenic acid according to claim 1, wherein the first roasting process is finished when a content of S in the roasted residue is within a range of 0.5 to 20 mass %.

3. The method for producing the aqueous solution of perrhenic acid according to claim 1, wherein the first roasting process is performed at an in-furnace temperature of 100 to 350° C.

4. The method for producing the aqueous solution of perrhenic acid according to claim 1, wherein the second roasting process is performed at an in-furnace temperature of 200 to 600° C.

5. The method for producing the aqueous solution of perrhenic acid according to claim 1, wherein the oxygen-containing gas is preheated at 100° C. or higher in the first roasting process and the second roasting process.

6. The method for producing the aqueous solution of perrhenic acid according to claim 1, wherein the step for cooling and solidifying the gasified rhenium oxide is performed while keeping entrained sulfur oxide in a gaseous state for solid-gas separation of the sulfur oxide.

7. The method for producing the aqueous solution of perrhenic acid according to claim 1, wherein the solidified rhenium oxide is collected on a material insoluble in rhenic acid in the step for cooling and solidifying the gasified rhenium oxide.

8. A method for producing potassium perrhenate, comprising adding potassium hydroxide to the aqueous solution of perrhenic acid obtained by the method for producing an aqueous solution of perrhenic acid according to claim 1 so as to precipitate potassium perrhenate.

9. A method for producing ammonium perrhenate, comprising controlling a pH of the aqueous solution of perrhenic acid obtained by the method for producing an aqueous solution of perrhenic acid according to claim 1, such that the pH is from 7 to 12, by adding aqueous ammonia to the aqueous solution of perrhenic acid so as to precipitate ammonium perrhenate.

10. A method for producing rhenium metal, comprising adding potassium hydroxide to or controlling a pH of the aqueous solution of perrhenic acid obtained by the method for producing an aqueous solution of perrhenic acid according to claim 1, wherein the step of adding potassium hydroxide results in precipitation of potassium perrhenate, and wherein the step of controlling the pH comprises controlling the pH to 7 to 12 by adding aqueous ammonia to the aqueous solution of perrhenic acid so as to precipitate ammonium perrhenate, and reducing the potassium perrhenate or ammonium perrhenate.

11. A method for producing an aqueous solution of perrhenic acid, comprising:
1) performing a first roasting of rhenium sulfide containing at least one of zinc and bismuth under an oxygen-containing gas to generate rhenium oxide and sulfur oxide, the sulfur oxide being gasified for discharge and the rhenium oxide being obtained as a roasted residue along with the at least one of zinc and bismuth;
2) performing a second roasting of the roasted residue under an oxygen-containing gas to separate the at least one of zinc and bismuth as a roasted residue and to collect gasified rhenium oxide;
3) cooling and solidifying the gasified rhenium oxide, or dissolving the gasified rhenium oxide into water while water-cooling to obtain the aqueous solution of perrhenic acid; and
4) where the rhenium oxide is solidified, dissolving the solidified rhenium oxide into water, or heating and gasifying the solidified rhenium oxide and then dissolving the gasified rhenium oxide into water, to obtain the aqueous solution of perrhenic acid.

12. The method for producing the aqueous solution of perrhenic acid according to claim 11, wherein the first roasting process is finished when a content of S in the roasted residue is within a range of 0.5 to 20 mass %.

13. The method for producing the aqueous solution of perrhenic acid according to claim 11, wherein the first roasting process is performed at an in-furnace temperature of 100 to 350° C.

14. The method for producing the aqueous solution of perrhenic acid according to claim 11, wherein the second roasting process is performed at an in-furnace temperature of 200 to 600° C.

15. The method for producing the aqueous solution of perrhenic acid according to claim 11, wherein the oxygen-containing gas is preheated at 100° C. or higher in the first roasting process and the second roasting process.

16. The method for producing the aqueous solution of perrhenic acid according to claim 11, wherein the step for cooling and solidifying the gasified rhenium oxide is performed while keeping entrained sulfur oxide in a gaseous state for solid-gas separation of the sulfur oxide.

17. The method for producing the aqueous solution of perrhenic acid according to claim 11, wherein the solidified rhenium oxide is collected on a material insoluble in rhenic acid in the step for cooling and solidifying the gasified rhenium oxide.

18. A method for producing potassium perrhenate, comprising adding potassium hydroxide to the aqueous solution of perrhenic acid obtained by the method for producing an aqueous solution of perrhenic acid according to claim 11 so as to precipitate potassium perrhenate.

19. A method for producing ammonium perrhenate, comprising controlling a pH of the aqueous solution of perrhenic acid obtained by the method for producing an aqueous solution of perrhenic acid according to claim 11, such that the pH is from 7 to 12, by adding aqueous ammonia to the aqueous solution of perrhenic acid so as to precipitate ammonium perrhenate.

20. A method for producing rhenium metal, comprising adding potassium hydroxide to or controlling a pH of the aqueous solution of perrhenic acid obtained by the method for producing an aqueous solution of perrhenic acid according to claim 11, wherein the step of adding potassium hydroxide results in precipitation of potassium perrhenate, and wherein the step of controlling the comprises controlling the pH to 7 to 12 by adding aqueous ammonia to the aqueous solution of perrhenic acid so as to precipitate ammonium perrhenate, and reducing the potassium perrhenate or ammonium perrhenate.

* * * * *

UNITED STATES PATENT AND TRADEMARK OFFICE
CERTIFICATE OF CORRECTION

PATENT NO. : 9,631,259 B2  
APPLICATION NO. : 14/400122  
DATED : April 25, 2017  
INVENTOR(S) : Ikunobu Sumida et al.

Page 1 of 1

It is certified that error appears in the above-identified patent and that said Letters Patent is hereby corrected as shown below:

In the Claims

In Claim 20, at Column 16, Line 33, change "controlling the comprises" to read --controlling the pH comprises--.

Signed and Sealed this  
Twenty-ninth Day of August, 2017

Joseph Matal  
*Performing the Functions and Duties of the*  
*Under Secretary of Commerce for Intellectual Property and*  
*Director of the United States Patent and Trademark Office*